United States Patent [19]

Rahn et al.

[11] 3,968,021

[45] July 6, 1976

[54] ELECTROLYTIC CELL HAVING HYDROGEN GAS DISENGAGING APPARATUS

[75] Inventors: Henry W. Rahn, Pittsburgh, Pa.; Hugh Cunningham, Corpus Christi, Tex.; Colonel R. Dilmore, New Martinsville, Tex.; Thomas C. Jeffery, Lake Charles, Tex.; Carl W. Raetzsch, Corpus Christi, Tex.

[73] Assignee: PPG Industries, Inc., Pittsburgh, Pa.

[22] Filed: May 29, 1975

[21] Appl. No.: 581,601

Related U.S. Application Data

[62] Division of Ser. No. 457,299, April 2, 1974, Pat. No. 3,938,150.

[52] U.S. Cl. .............................................. 204/256
[51] Int. Cl.² .......................................... C23B 9/00
[58] Field of Search ..................... 204/256, 98, 129

[56] References Cited
UNITED STATES PATENTS

| | | | |
|---|---|---|---|
| 1,855,732 | 4/1932 | Smith | 204/258 |
| 3,855,091 | 12/1974 | Piester | 204/256 |

*Primary Examiner*—R. L. Andrews
*Attorney, Agent, or Firm*—Richard M. Goldman

[57] ABSTRACT

Disclosed is a bipolar electrolyzer having a horizontal hydrogen channel separate from the catholyte chamber. There are apertures between the horizontal hydrogen channel and the catholyte chamber to enable catholyte gas, i.e., hydrogen, with entrained cell liquor, to enter the channel. At one end of the channel is a gas disengaging chamber. The gas disengaging chamber includes a catholyte gas deflector interposed between the outlet of the horizontal channel and the interior of the disengaging chamber, hydrogen recovery means, and catholyte liquor recovery means. In the operation of an electrolytic cell as disclosed herein, catholyte gas, i.e., hydrogen gas with entrapped catholyte liquor, is removed from the catholyte chamber to the horizontal channel. The catholyte gas is then transported through the horizontal channel to the outlet of the horizontal channel and into the disengaging chamber. As the catholyte gas enters the disengaging chamber, its direction of flow is deflected while its linear velocity is reduced. The direction of flow of the gas is then reversed and the linear velocity reduced further, disengaging the catholyte liquor from the hydrogen. Finally, the hydrogen gas, substantially free of catholyte liquor, is recovered from the disengaging chamber.

4 Claims, 8 Drawing Figures

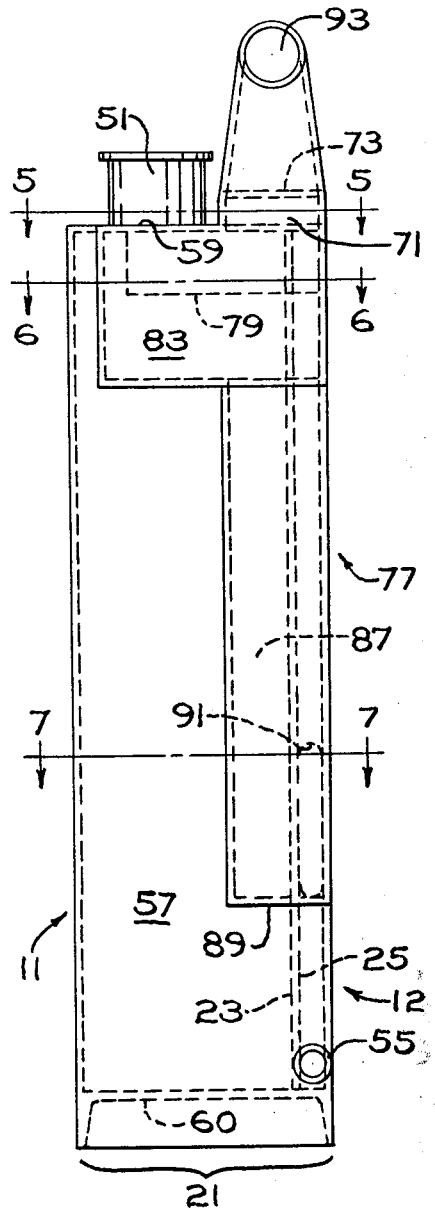
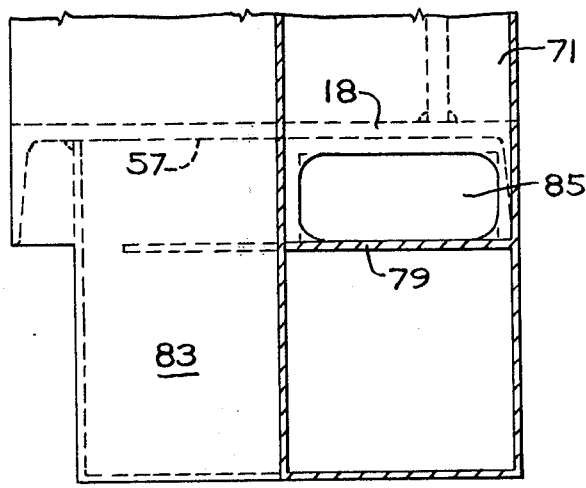
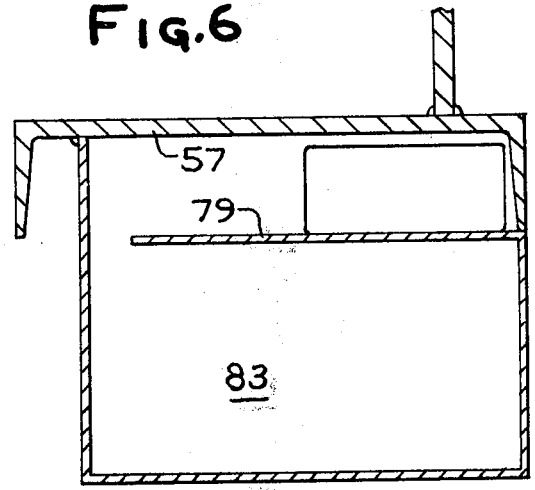
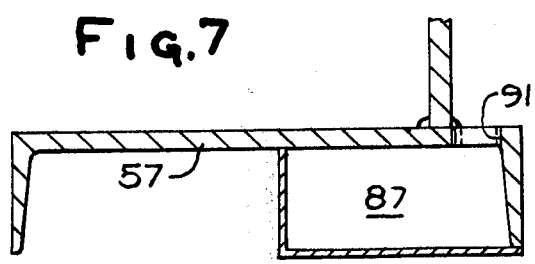
FIG. 4
FIG. 5
FIG. 6
FIG. 7

3,968,021

ELECTROLYTIC CELL HAVING HYDROGEN GAS DISENGAGING APPARATUS

This is a division of application Ser. No. 457,299, filed Apr. 2, 1974, now U.S. Pat. No. 3,938,150.

BACKGROUND OF THE INVENTION

In bipolar diaphragm cells having interleaved anodes and cathodes, large electrolyte volumes are possible with small backplate areas. In such cells, large quantities of cathode gases, i.e., hydrogen, are evolved per unit area of backplate. The cathode gases contain entrained catholyte liquor, and when the cathode gases are recovered from the cell the catholyte liquor must be removed from the gas.

The presence of entrained catholyte liquor in the hydrogen causes foaming in the hydrogen gas outlet. This, in turn, inhibits hydrogen flow out of the catholyte chamber, causing slugging and surging of the catholyte liquor. The slugging and surging of the catholyte liquor is associated with oscillations in the hydrogen back pressure on the diaphragm, cathode current efficiency, and cell liquor strength. It is, therefore, advantageous to remove as much of the entrained cell liquor as possible prior to removing the hydrogen gas from the cell.

SUMMARY

It has now surprisingly been found that the entrained liquor present in the hydrogen gas advantageously may be removed from the hydrogen by withdrawing the hydrogen gas from the catholyte chamber to a cell liquor disengaging system having a horizontal channel and a cell liquor disengaging tank. The hydrogen gas is transported through the horizontal channel at a high velocity relative to its velocity in the disengaging chamber, to the disengaging chamber. The catholyte liquor is partially removed from the gas by passing the gas through a disengaging chamber. In the disengaging chamber, the direction of flow is deflected and the linear velocity is reduced. Then, the direction of flow of the gas is reversed and the velocity further reduced, thereby disengaging catholyte liquor from the hydrogen. In this way, hydrogen gas substantially free of entrained catholyte liquor is obtained.

DETAILED DESCRIPTION OF THE INVENTION

The method of reducing the entrained catholyte liquor content of the hydrogen gas, and apparatus for reducing the entrained catholyte liquor content of the hydrogen gas may be understood by reference to the appended figures. In the figures:

FIG. 4 is a side view of the cell unit shown in FIG. 2.

FIG. 5 is a cutaway view along cutting plane 5—5 of FIG. 4.

FIG. 6 is a further cutaway view along plane 6—6 of FIG. 4 at the same angle as the view in FIG. 5 but at a lower location in the cell.

FIG. 7 is a cutaway view along plane 7—7 of FIG. 4 and is the same angle as the views of FIGS. 5 and 6 but is at a lower level in the hydrogen gas disengaging apparatus.

Figure 1:
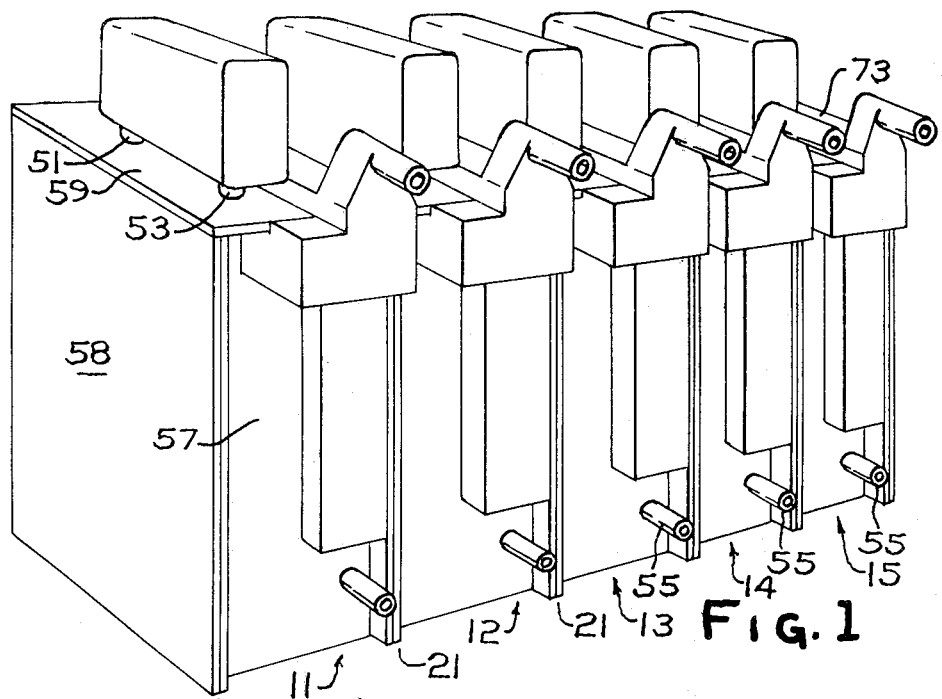
FIG. 1 is an isometric view of a bipolar electrolyzer having one exemplification of the brine disengaging apparatus of this invention.

A typical bipolar electrolyzer 1 is shown in isometric view in FIG. 1. The typical bipolar electrolyzer 1 has a plurality of individual electrolytic cells, 11, 12, 13, 14, 15, for example, 3 or 5 or more, for example, as many as 11 or 15 or even 75 individual cells in a single electrolyzer. The individual cells, 11 through 15 are electrically and mechanically in series sharing a common structural member 21 between adjacent cells. The common structural member also referred to as a backplate 21, has the cathodes 31 of one cell 12 and the anodes 41 of the next adjacent cell 11 mounted on opposite sides thereof. The backplate 21 provides electrical conductivity between adjacent cells while preventing the flow of electrolyte therebetween.

An individual electrolytic cell 12 of the electrolyzer 1 includes the anodic side of one cell unit and the cathodic side of the next adjacent cell unit.

Figure 2:
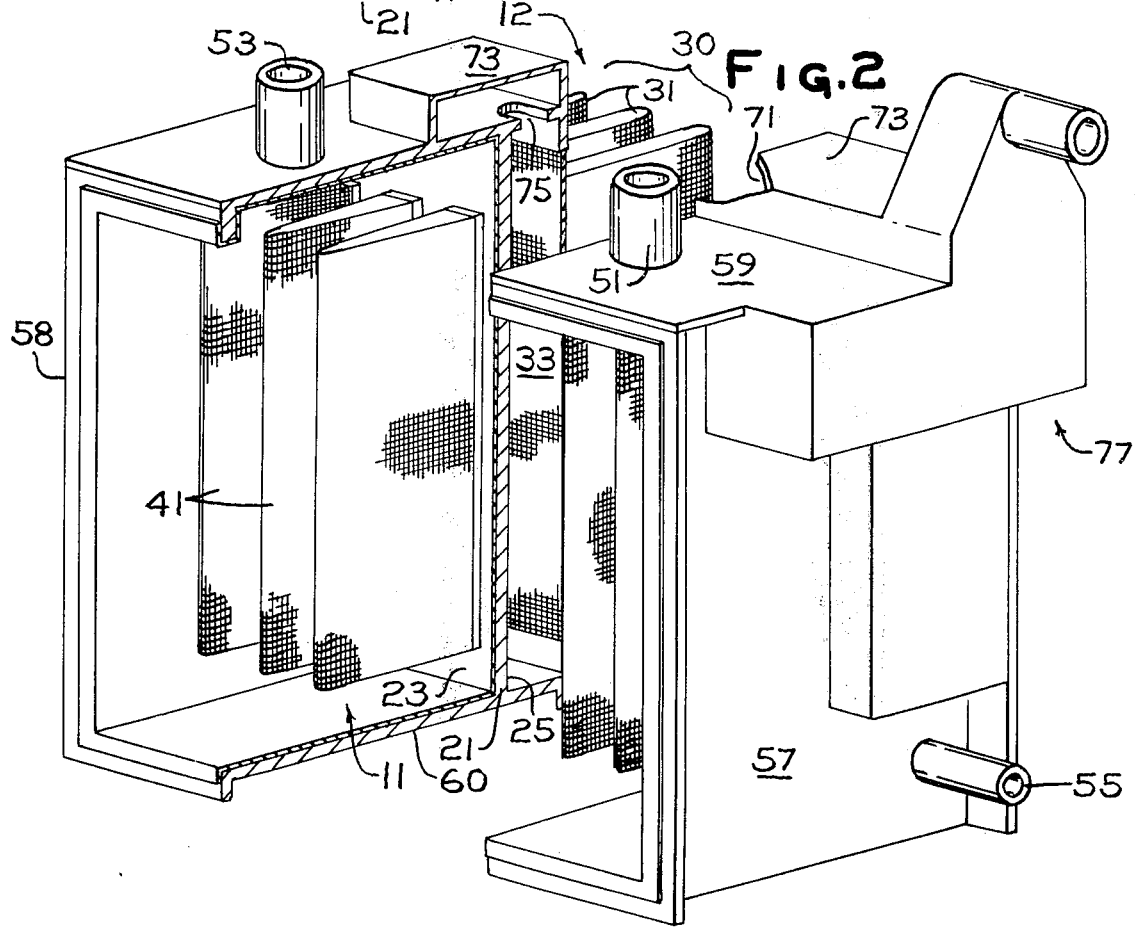
FIG. 2 is an exploded, partial cutaway view of an individual cell unit of the bipolar electrolyzer shown in FIG. 1.

An individual cell unit is shown in FIG. 2. The individual cell unit includes a backplate 21 with the cathodes 31 of one cell 12 mounted on the backplate 21 and the anodes 41 of the next adjacent cell 11 mounted on the opposite surface of the backplate 21. The cell unit also includes the associated hardware such as the brine feed means, i.e., downcomer 51, the brine drainage means, the anodic gas recovery means, i.e., chlorine riser 53, the caustic soda recovery means 55, and the hydrogen gas recovery means 61. The cell unit also includes side walls 57 and 58, a top 59, and a bottom 60.

An individual cell of a bipolar electrolyzer is divided into an anolyte chamber and a catholyte chamber by a permeable barrier. Two cell units, as described above, facing each other, substantially parallel to each other and substantially coextensive with each other define an individual cell.

An individual cell includes the anodic half of a first cell unit. The anodic half of the cell unit has an anolyte-resistant surface 23. The anolyte-resistant surface 23 may be a valve metal such as titanium, tantalum, tungsten, zirconium, and their alloys. The valve metals are those metals which form a non-reactive, substantially inert oxide film upon exposure to acidic media under anodic conditions. Alternatively, the anolyte-resistant surface 23 may be a rubber or plastic lining.

Attached to the anolyte-resistant surface 23 of the backplate 21 are a plurality of anodes 41. The anodes may be fabricated of a valve metal, as defined above, and have a suitable electroconductive, electrocatalytic coating thereon. Electroconductive, electrocatalytic coatings may be provided by those materials having a low chlorine overvoltage, e.g., less than about 0.25 volt at 200 Amperes per square foot, resistance to the anolyte liquor and electrical conductivity. Alternatively, the anodes 41 may be silicon blades having a suitable electroconductive surface. Or, the anodes 41 may be graphite fingers or blades extending from the backplate 21.

The anodes are suitably mounted on the backplate, for example, by corrosion-resistant bolts, studs, welding or the like.

The second cell unit of the individual cell has a catholyte-resistant surface 25 facing the anolyte-resistant surface 23 of the first cell unit. Typically, the catholyte-resistant surface 25 is provided by iron, steel, stainless steel, copper, lead, nickel, cadmium, or the like.

Connected to the catholyte-resistant surface 25 of the backplate 21 are cathode means 30, i.e., hollow cathode fingers 31 and the cathodic backscreen 33. The hollow cathode fingers 31 are interleaved between anodes 41 of the facing cell unit. The cathodic backscreen 33 is parallel to and spaced from the backplate 21. The volume within the hollow cathode finger 31 and behind the cathodic backscreen 33 between the backscreen 33 and the catholyte-resistant surface 25 of the backplate is commonly referred to as the catholyte chamber of the individual electrolytic cell.

The cathodes 31 and cathodic backscreen 33 may be fabricated in the form of mesh or perforate plate. The cathodes 31 and cathodic backscreen 33 are fabricated of a catholyte-resistant material, e.g., iron, steel, stainless steel, nickel, cobalt, or the like.

Permeable barrier means are interposed between the anodes and cathodes dividing the individual cells into an anolyte chamber and a catholyte chamber. The permeable barrier means may be an electrolyte permeable barrier, fabricated, for example, of asbestos, chemically treated asbestos, silicate impregnated asbestos, or perfluoro acid resin treated asbestos. Alternatively, the barrier means may be an ion permeable barrier, i.e., a permionic membrane, such as, for example, a DuPont NAFION (TM) resin membrane.

The barrier may be deposited on the cathode, as a deposited asbestos diaphragm or alternatively it may be applied to the cathode as a membrane or sheet.

The individual cell 12 includes brine feed means such as downcomer 51. The downcomer 51 may feed directly into the anolyte chamber. Alternatively, in an electrolytic cell configuration where one diaphragm or membrane is applied to the cathodes and a second diaphragm or membrane is applied to the anodes, thereby creating an intermediate chamber therebetween, the feed may be into this intermediate chamber. The individual electrolytic cell also includes anodic gas recovery means 53, and means for recovering catholyte liquor, i.e., cell liquor 55 from the electrolytic cell.

Figure 3:
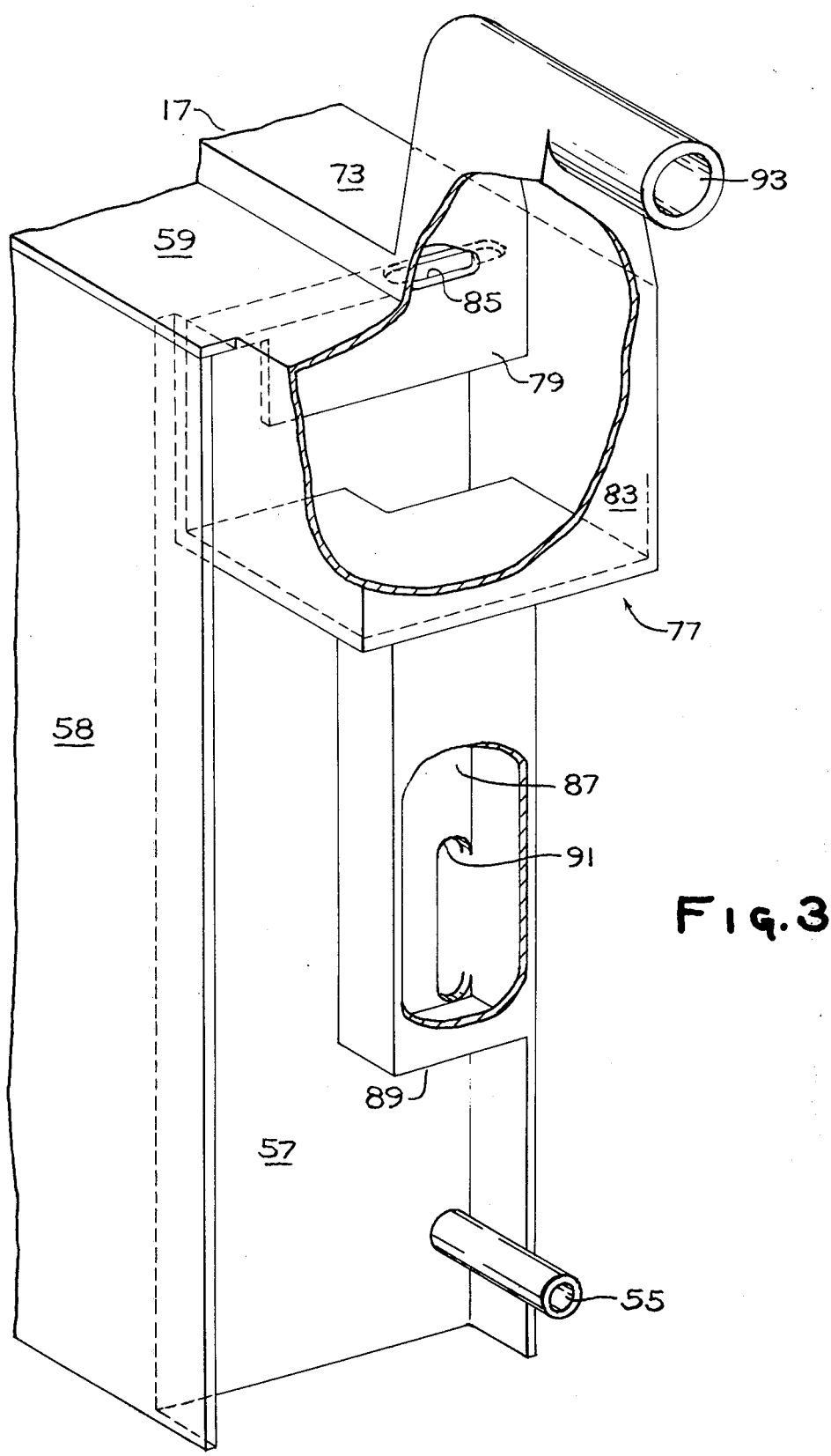
FIG. 3 is a partial cutaway view of the cell liquor disengaging means of the individual cell unit shown in FIG. 2.
Figure 8:
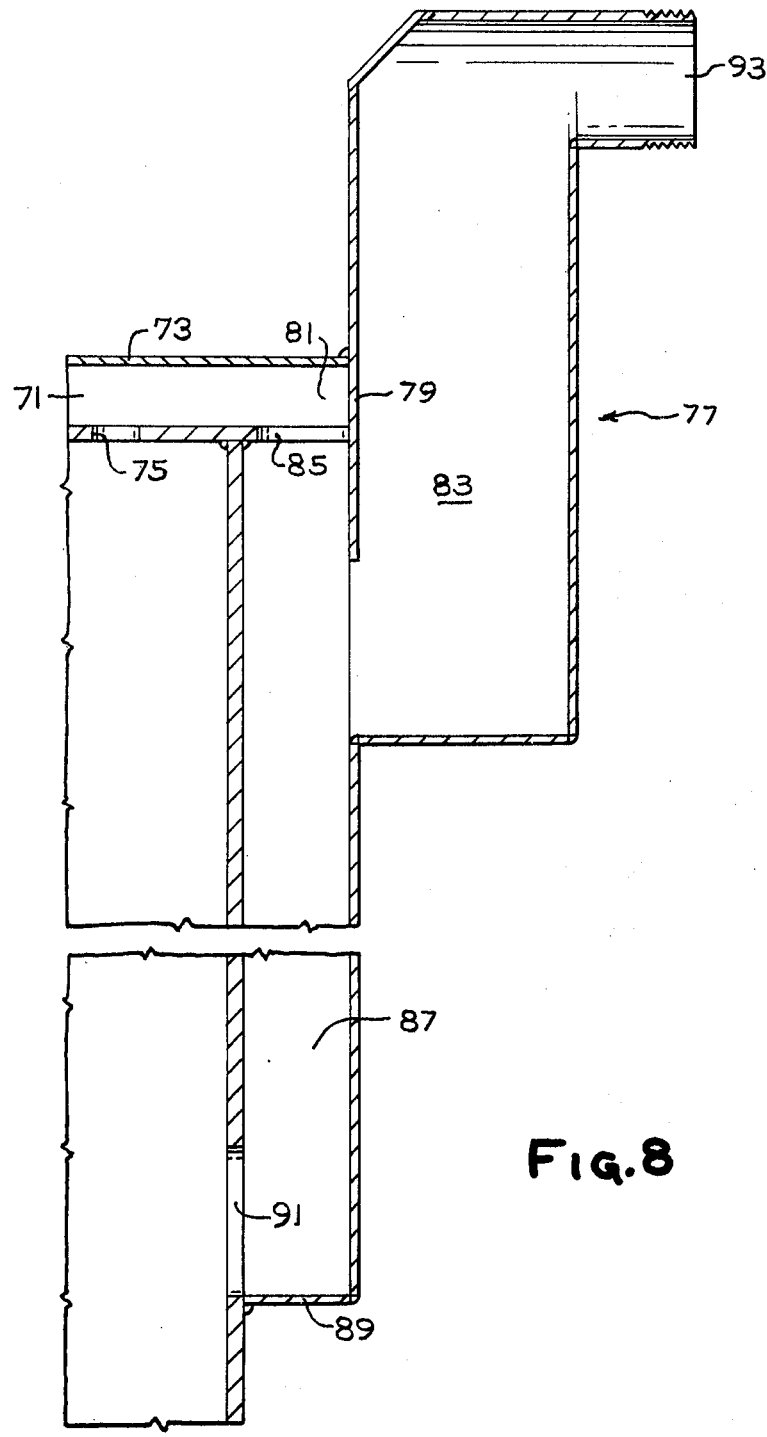
FIG. 8 is a view of the hydrogen gas disengaging apparatus of this invention along plane 8—8 of FIG. 4.

The cathodic gas disengaging apparatus of this invention may be more particularly understood by reference to the figures. As shown in FIGS. 2 and 3, a horizontal channel means 71 extends across the top 59 of the cell body. Alternatively, this horizontal channel means 71 may be within the cell body.

In the exemplification here shown, the horizontal channel means 71 is provided by an iron channel 73 on the top 59 of the cell body. The external horizontal channel means 71 may, however, be a circular conduit or the like.

The horizontal channel means 71 extends sufficiently far across the top 59 of the cell body to collect the hydrogen evolved at the cathodes at a sufficient rate to avoid gas blinding and build up of gas bubbles and foam within the catholyte chamber. The horizontal channel 71 is of sufficient vertical cross sectional area transverse to the flow of the hydrogen gas to transport the gas and entrained cell liquor at a high linear velocity relative to the gas velocity in the rest of the disengaging system. The linear velocity in the horizontal channel is almost always above six feet per second, is generally above eight feet per second, preferably above ten feet per second, and frequently as high as fifteen feet per second or more.

Along the bottom of the horizontal channel 71 and in hydraulic communication with the catholyte chamber are apertures 75. Gas disengaging chambers 77 are provided at at least one end, and occasionally at both ends of the horizontal channel 71.

The apertures 75 between the channel 71 and the catholyte chamber provide fluid communication between the catholyte chamber and the horizontal channel 71. In this way, hydrogen gas containing entrained catholyte liquor can be removed from the catholyte chamber to the horizontal channel 71. Sufficient apertures 75 are provided to allow the hydrogen containing entrained catholyte liquor to readily enter the horizontal channel 71.

The gas disengaging means 77 at the end of the channel may be particularly understood by reference to FIGS. 4 through 8. The gas disengaging means at the outlet of the horizontal channel 71 disengages catholyte liquor from the hydrogen gas. The gas disengaging chamber 77 includes gas deflection means 79. The gas deflection means 79 are interposed between the outlet 81 of the horizontal channel 71 and the interior 83 of the disengaging chamber 77. At this deflection means, the direction of the flow of hydrogen gas containing entrained cell liquor is deflected downward. Simultaneously, the velocity of the gas is reduced by a factor of from about 0.25 to about 0.50, based on the velocity of the gas in the horizontal channel 71. That is, the velocity of the gas is reduced from a horizontal linear velocity in the horizontal channel 71 of from about six to about fifteen feet per second to a downward linear velocity of from about two to about eight feet per second.

The deflection means shown in the figures is a baffle 79. As shown, for example, in FIG. 5, the gas flows from the channel 71 against the baffle 79 and is driven downward, for example, through aperture 85, thereby imparting a downward vertical component to the linear velocity of the gas. This downward velocity continues until the gas impinges upon the cell liquor collected in the vertical cell liquor channel 87 shown in FIGS. 4, 7, and 8. Alternatively, the gas may impinge upon the bottom 89 of the channel 87. At this point, there is a further deflection or reversal of the linear velocity of the gas, resulting in an upward flow. Accompanying this upward deflection is a further reduction in linear velocity which serves to disengage the cell liquor from the hydrogen gas. In this further reduction in velocity, the vertical velocity is reduced by a factor or from about 0.1 to about 0.2, basis to velocity in the horizontal channel 71. For example, the upward velocity is now from about 1 to about 2 feet per second compared to a velocity of from about 6 to about 15 feet per second in the horizontal channel. This is accomlished by an increase in the horizontal area of the disengaging chamber 83.

The deflection and resulting upward component of the velocity of the hydrogen gas at the further reduced velocity results in the separation or disengaging of the cell liquor from the hydrogen. The cell liquor is then returned to the cell, for example through cell liquor return aperture 91 shown in FIGS. 4 and 8 while the hydrogen gas is recovered from the interior 83 of the disengaging chamber 77 through aperture 93 substantially free of cell liquor.

While the disengaging means of this invention is shown with reference to a rectangular horizontal channel mounted atop the cell body and a single disengaging chamber at one end of the channel, which single disengaging chamber utilizes a baffle plate for deflecting the hydrogen gas, other equivalent structures are within the intended scope of this invention. For example, the horizontal channel may be a cylindrical channel and the horizontal channel may be mounted within the cell body rather than atop the body. Additionally, gas disengaging means may be at both extreme ends of the horizontal channel 71. Additionally, the deflecting means may be screens, mesh, elbows, 90° elbows, 60° elbows, 45° elbows, Tee's, expansion valves, a liquid-gas cyclone, a high surface area sieve, or the like.

It is to be understood that although the invention has been described with specific reference to particular embodiments thereof, it is not to be so limited since changes and alterations therein may be made which are within the full intended scope of this invention as defined by the appended claims.

We claim:

1. In a chlor-alkali bipolar electrolyzer comprising a plurality of individual diaphragm cells electrically and mechanically in series, each of said cells comprising:
    a first cell unit having an anolyte-resistant backplate;
    anode means mounted on the backplate of said first cell unit;
    a second cell unit having a catholyte-resistant backplate;
    hollow cathode means mounted on the backplate of said second cell unit;
    permeable barrier means interposed between said anode means and said hollow cathode means, and dividing said individual cell into an anolyte chamber and a catholyte chamber including said hollow cathode means;
    means for feeding brine to said cell;
    means for recovering anodic gas of said cell;
    means for recovering cathodic gas from the catholyte chamber of said cell; and
    means for recovering cell liquor from the catholyte chamber of said cell;
    the improvement wherein said cathodic gas recovery means comprises:
    horizontal channel means extending across substantially the entire width of said cell and separate from said catholyte chamber;
    a plurality of apertures between said channel means and said catholyte chamber, at least one of said apertures being at an end of the channel means opposite an outlet therefrom;
    gas disengaging means at the outlet of said channel means, which disengaging means comprises:
    a disengaging chamber;
    catholyte gas downward deflection means and catholyte gas upward deflection means interposed between the outlet of said horizontal channel and the gas outlet of said disengaging chamber whereby to deflect catholyte gas first downward and then upward;
    hydrogen recovery means at the outlet from said disengaging means; and
    catholyte liquor recovery means.

2. The bipolar electrolyzer of claim 1 wherein the catholyte gas downward deflecting means is chosen from the group consisting of screens, mesh, elbows, Tee's, expansion valves, liquid-gas cyclones, high surface area sieves, baffles, and nozzles.

3. The bipolar electrolyzer of claim 1 wherein the catholyte gas downward deflecting means and upward deflecting means each comprise a baffle.

4. The bipolar electrolyzer of claim 1 wherein the catholyte gas downward deflecting means comprises a nozzle at the end of the channel means.

* * * * *